Jan. 7, 1969     F. P. CARUTHERS     3,421,009
TEMPERATURE COMPENSATED PHOTOSENSOR SYSTEM
Filed June 14, 1966
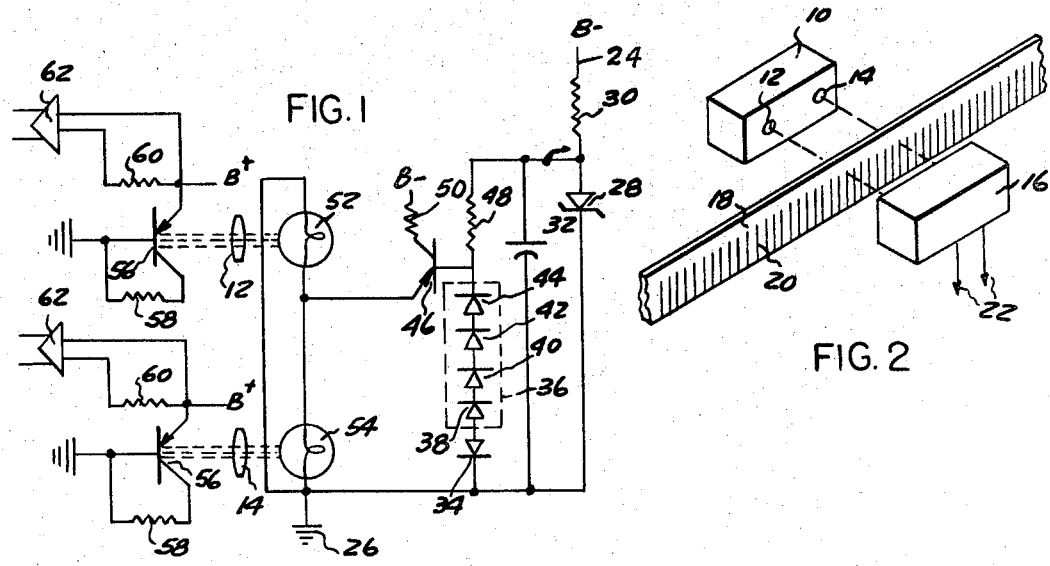
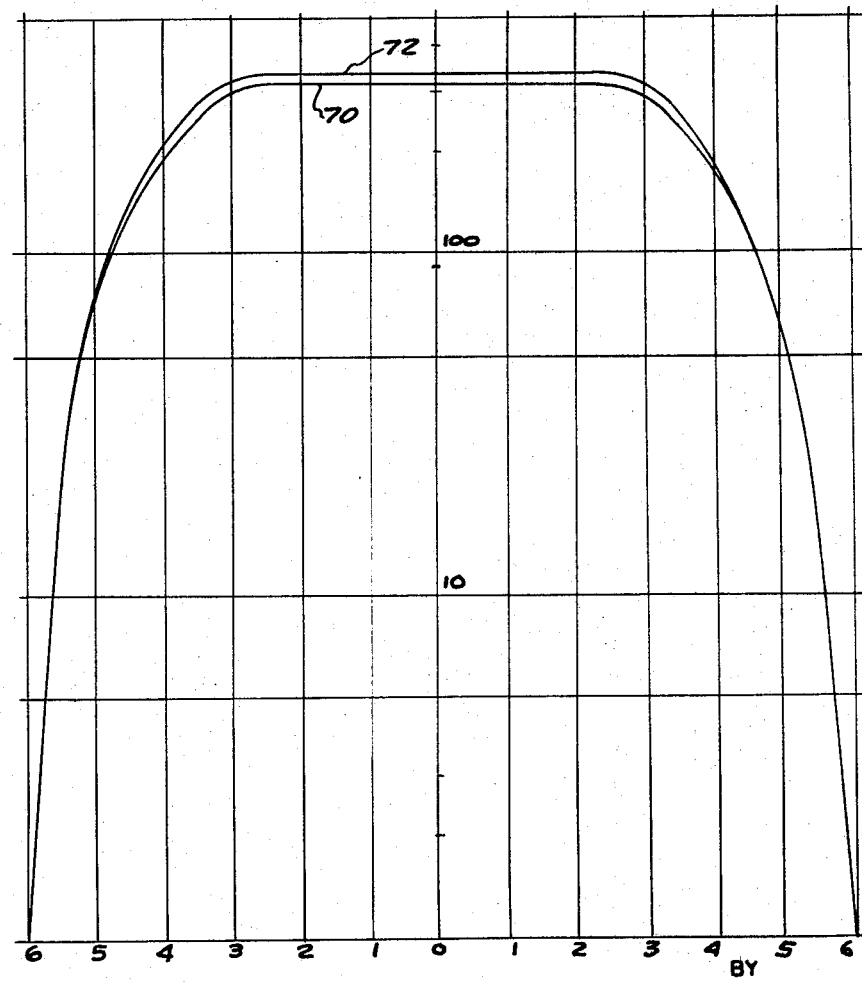
INVENTOR
FELIX P. CARUTHERS
ATTORNEYS United States Patent Office 3,421,009
Patented Jan. 7, 1969

3,421,009
TEMPERATURE COMPENSATED
PHOTOSENSOR SYSTEM
Felix P. Caruthers, 6400 Navajo Court,
Birmingham, Mich. 48010
Filed June 14, 1966, Ser. No. 557,433
U.S. Cl. 250—217       5 Claims
Int. Cl. H01j 39/12; G02f 1/28

ABSTRACT OF THE DISCLOSURE

An optical system, including a lamp and a photosensitive device, provides an output responsive to the input from the lamp. The power supply for the lamp includes temperature sensitive compensating elements.

---

This invention relates to electronic systems wherein a photosensor receives the output of a light source and utilizes information contained in the light output for control purposes. The information may be encoded in the light beam either by the source or by some modulation of the beam between the source and the sensor. More particularly, this invention relates to circuitry for compensating both the sensor and the light source against component performance changes which occur as a result of temperature changes or other variations in other ambient conditions.

Certain classes of electronic systems which employ light sources and optical sensors for the light, are relatively insensitive to small variations in the light output of the source, or in the sensitivity of the sensor unit. These systems simply operate in a digital manner to sense whether the light is on or off. For example, they may be used to buffer to isolate two sections of an electronic system. Other classes of circuits employing light sources and sensors are extremely sensitive to variations in the light output of the source. This latter class includes all analog systems wherein the sensor must provide a proportional output depending upon the intensity of the light beam it receives and also digital systems wherein the sensor must detect the exact instant that the light intensity reaches a preselected level. In systems wherein the time at which the signal reaches a preselected level is a function of position of a member, any error which might occur as a result of the variations in the signal source level or in the sensor sensitivity, would result in an error in the detection of the position of the moving member and therefor would inherently limit the accuracy of the system.

In order to provide a high degree of accuracy and stabilization in such optical source-sensor systems, previous circuits have employed compensating elements in both the source circuit and the sensor circuit. These elements are normally applied for temperature compensation and they have electrical characteristics which vary in the reverse manner of the temperature sensitive element. For example, if a source employs a semiconductor amplifier having a negative coefficient of temperature sensitivity, that is, its resistance increases with the temperature, it is common practice to place a germanium transistor in back-to-back relationship in order to introduce a positive coefficient of temperature sensitivity, with the semiconductor rectifier junction. The use of the two results in a balanced effect wherein the circuit output is independent of temperature variations at the semiconductors. Similarly, various compensating elements are employed in connection with the sensor to make it independent of temperature variation. Several problems are present in such double compensating systems. When phototransistor devices are employed as the sensing element, their high sensitivity requires that the compensating element have almost an exact reverse temperature response curve. Any variation from this idea will result in some inaccuracies. Second, it is difficult to align such systems without having some independent, known light source, since errors in the compensation of one circuit will create resulting inaccuracies as in the compensation of the other circuit. Third, the circuitry and number of compensating elements used is relatively complex.

The present invention accordingly proposes a compensating system for circuits of this type which obviates all of these problems. In essence, it consists of utilizing compensating elements in the light source which not only correct for variations in the light source but compensate for variations in the photosensor with which the light source is used. The result is a light source which has a temperature sensitivity output characteristic which is complementary to the sensitivity pattern of the uncompensated light sensor with which it is employed. While such a light source would be of little use in connection with a compensated sensor, and the uncompensated sensor which the system contemplates would be of little use with a normally compensating source, the characteristics of the two mesh with one another to provide a system which has a sensor output that is independent of the ambient temperature variations.

By placing all of the compensating elements in the light source circuit, advantage is taken of the fact that the light producing element will normally have a rather gross voltage characteristic when compared with the photosensor. That is, relatively large change in the voltage provided to the source will produce a relatively small change in its light output, and accordingly, compensating elements of lower accuracy than would be required in the sensing circuit may be employed to compensate the source for both its own temperature characteristic and that of the sensor. Of course, the number of elements and circuitry employed in systems of the present invention is simpler than that of previous systems because the elimination of the use of compensating elements in the sensor. Additionally, the unit may be aligned without the need of any special standards since only the compensating elements in the source need be adjusted to provide a linear output from the sensor at varying temperatures.

The invention is useful with both rotary and linear transducers and may either be connected to detect a single line or to integrate over several lines or patterns such as is done with a moire fringe pickup unit.

In a preferred embodiment of the invention which will be subsequently disclosed in detail, a pair of phototransistor sensors are employed to pick up the outputs of a dual light source as modulated by a ruled optical grating associated with a position feedback system. The two sensors are directly connected to amplifying circuits without any form of compensation and are therefore temperature sensitive. The two sources are connected in parallel to the emitter-base circuit of a transistor amplifier, in series with a Zener diode and a temperature compensating element. The Zener diode provides a high degree of voltage stability. The compensating elements are selected to provide a linear output to the phototransistor amplifiers, independent of temperature variations, over a wide operating range. In the preferred embodiment, the temperature compensating element simply consists of a series train of germanium diodes, connected in a positive direction so as to compensate for the reverse current characteristic of the emitter-base circuit of the transistor as well as the negative temperature coefficient of the phototransistor sensors.

It is therefore seen to be a primary object of the present invention to provide light source and a photodetector for the source wherein the powering circuit for the source contains temperature compensating elements which compensate both for the variations of the source and the sensor, to provide a constant output from the sensor during temperature excursions.

Other objects, advantages and applications of the present invention will be made apparent by the following detailed description of a preferred embodiment to the invention. The description makes reference to the accompanying drawings in which:

FIGURE 1 is a schematic diagram of the circuitry of the preferred embodiment of the invention;

FIGURE 2 is a perspective view of the two units of the system; and

FIGURE 3 is a curve relating the sensor output to the transducer position for various ambient temperatures.

Referring to the drawings, the inventive circuits form part of a position control system including a light source 10 which produces a pair of optically collated beams through lens systems 12 and 14; a receiver or sensing unit 16 and an optical grating element 18 interposed between the two. The optical grating element may take any one of a variety of forms but is shown to broadly consist of an elongated transparent glass member having a plurality of opaque transverse rulings 20 disposed at regular spacings with respect to one another along its entire length. The light beams produced by the lens systems 12 and 14 are spaced from one another along a line which is parallel to the length of the optical element 18 and transverse to the rulings 20. The rulings 20 interact with the light beams produced by the lens systems 12 and 14 to interrupt one or both of the beams depending upon the particular position of the optical element 18 with respect to the source 10 and the sensor 16. The three units, 10, 16 and 18 are appropriately supported so that relative motion occurs between the optical element 18 and the source 10 and the sensor 16. Preferably, the optical element 18 will be associated with moving element and will move parallel to its length between the stationary source 10 and the sensor 16. The purpose of the system is to provide output signals on the lines 22 from the sensor 16 representative of pulses received by each of the two units of the sensor as the optical element moves across their respective light beams.

As one vertical grating member moves across one of the sensor units, an electrical signal is received by the sensor which generally approximates either of the two curves shown in FIGURE 3 which will be discussed in more detail. The sensor unit may include an element which provides an output signal when a certain current level is achieved by the sensor. It would be readily apparent that as the sensitivity of the sensor or the light output of the source varies, the current level achieved by the sensor circuit will vary and the positional accuracy of the system will be modified. Accordingly, it is the primary object of the circuitry of FIGURE 1 to provide a constant output from the sensor independent of the ambient temperature variations.

Referring to FIGURE 1, the sensor elements are powered by a supply which connects between the line 24 which is negative and the ground element 26. A first Zener diode 28 is disposed in series with a current limiting resistor 30 across the power supply. The Zener 28 is connected so that its reverse current characteristic provides a generally regulated voltage to a shunting electrolytic capacitor 32, which tends to filter any transients. While the Zener diode 28 provides a good degree of voltage regulation, its reverse voltage-resistance curve is not exactly flat. Accordingly, a second Zener diode 34, having a lower breakover voltage than the Zener 28 is employed to provide a fully regulated voltage to the following light sources.

The Zener diode 34 is connected in series with a temperature compensating unit generally indicated at 36. As employed in the preferred embodiment, the temperature compensating unit 36 consists of a series combination of four germanium diodes 38, 40, 42 and 44. These germanium diodes have positive coefficients of temperature compensation. That is, as the temperature increases their forward resistance characteristic increases and the current passing through them decreases. The significance of this temperature resistance curve will be discussed subsequently. The base of an amplifying transistor 46 is connected to the terminal of the compensating element 36, opposite to that which is connected to the Zener diode 34, and is also connected to the negative terminal power supply through a resistor 48. The collector of the transistor is connected to the negative terminal power supply through a resistor 50.

A pair of incandescent lamps 52 and 54 are connected in parallel with one another in the emitter-base circuit of the transistor 46. Accordingly, the current flow through the collector-base circuit is controlled by the voltage across the Zener diode 34 and the temperature compensating element 36. The combination of the Zener 34 and the Zener 28 provides a highly regulated voltage in the absence of variations in the compensating element 36.

The optical systems 12 and 14 collate the light from the lamps 52 and 54 into beams which are projected at a pair of phototransistor amplifier circuits located in the sensor 16. The two circuits are identical and the description of one will apply equally well to the other. Each sensor circuit includes a phototransistor 56 which exhibits a lowering of its bulk resistivity when it is illuminated by a light of a short wavelength. The phototransistors have their collectors connected to the bases by a resistance 58 and their emitter connected to a positive voltage supply through resistance 60. An amplifier 62 provides output to subsequent decoding and detecting circuitry.

The elements which compose the temperature compensating circuit 36 are so chosen that a constant output will be provided to the amplifiers 62 under constant circuit conditions as the ambient temperature associated with the light source 10 and the sensor 16 is varied. The germanium diodes 38, 40, 42, 44 and 46 employed with the present embodiment are intended to first compensate for the forward voltage drop of the rectifying elements of the transistor 46 and then to compensate for the negative coefficient exhibited by the phototransistors 56.

It should be recognized that in this embodiment the light output of the lamps 52 and 54 will vary as a function of the ambient temperature; but the temperature-resistivity curves of the phototransistors 58 will act to convert this non-linear signal into a linear one.

FIGURE 3 represents a plot of the current output provided to the amplifier 62 as the function of the motion of one of the vertical bars 20 transversely with respect to the light beams produced by the lens systems 12 and 14. The ordinate of the curve represents the current output to the amplifiers and the abscissa represents positional departures from a zero position wherein one of the vertical gratings is in exact center of one of the beams of light. The curve number 70 represents the output of the amplifier at an ambient temperature of 25 degrees centigrade, while curve 72 represents the output of the amplifier at 65 degrees centigrade. While in theory the curves should be identical, this practical result far surpasses the best achievements of prior art circuits wherein compensating elements were utilized in both the source and the sensor. With this close correlation of the output curves different temperatures, the extent to which the circuit must be given leeway to distinguish the knee of the curve from the plateau is minimized as is the inherent positional accuracy to the circuit.

Having thus described my invention, I claim:

1. An optical system comprising: a sensor consisting of a light sensitive element and an amplifier connected to receive the electrical output of said light sensitive element, the characteristics of the elements forming the sensor being such that the sensor provides a non-constant output as the ambient temperature varies; a lamp, a power supply for said lamp; connections between the power supply and the lamp include a Zener diode shunting both the power supply and the lamp so as to provide a regulated voltage from the power supply; and temperature sensitive compensating elements connected to said power supply and said lamp so as to be operative to vary the power applied to the lamp as a function of the ambient temperature, said compensating elements being selected to compensate for both the temperature dependence of the lamp circuitry and the temperature sensitivity of the sensor, to provide a constant output from the sensor to the amplifier as the ambient temperature varies; and an optical system for transmitting the light output of the lamp to the light sensitive element.

2. The optical system of claim 1 wherein a semiconductor amplifier is disposed connected with the lamp across the series combination of the Zener diode and the compensating element.

3. An optical system comprising: a sensor consisting of a light sensitive element and an amplifier connected to receive the electrical output of said light sensitive element, the characteristics of the elements forming the sensor being such that the sensor provides a non-constant output as the ambient temperature varies; a lamp; a power supply for said lamp; and temperature sensitive compensating elements consisting of a series combination of rectifying elements connected to said power supply and said lamp so as to be operative to vary the power applied to the lamp as a function of the ambient temperature, said compensating elements being selected to compensate for both the temperature dependence of the lamp circuitry and the temperature sensitivity of the sensor, to provide a constant output from the sensor to the amplifier as the ambient temperature varies; and an optical system for transmitting the light output of the lamp to the light sensitive element.

4. The optical system of claim 3 wherein the connections between the lamp, the compensating element and the power supply include a semiconductor amplifier connecting the lamp to the series combination of the compensating element and a first Zener diode, and a second Zener diode connected across the series combination of the first Zener diode and the compensating element and across the power supply.

5. The optical system of claim 4 wherein the compensating elements consist of the series combination of a plurality of rectifying junctions disposed with respect to the power supply in a reverse direction to both of the Zener diodes.

References Cited

IBM Technical Disclosure Bulletin, vol. 8, No. 8, January 1966, article by Schoonover et al. p. 1087.

JAMES W. LAWRENCE, *Primary Examiner.*

E. R. LA ROCHE, *Assistant Examiner.*

U.S. Cl. X.R.

250—238; 307—310; 315—158